Mar. 3, 1925.　　　　　　　　　　　　　　　　　　1,528,143
F. B. COCKBURN
LOCK NUT
Filed May 2, 1923

Inventor
Francis B. Cockburn
By Wood & Wood
Attorneys

Patented Mar. 3, 1925.

1,528,143

UNITED STATES PATENT OFFICE.

FRANCIS B. COCKBURN, OF CINCINNATI, OHIO, ASSIGNOR TO THE LODGE & SHIPLEY MACHINE TOOL COMPANY, OF CINCINNATI, OHIO, A CORPORATION OF OHIO.

LOCK NUT.

Application filed May 2, 1923. Serial No. 636,256.

*To all whom it may concern:*

Be it known that I, FRANCIS B. COCKBURN, a subject of Great Britain, and residing at Cincinnati, in the county of Hamilton and State of Ohio, have invented a new and useful Improvement in Lock Nuts, of which the following specification is a full disclosure.

This invention primarily relates to an improvement in check nuts, and particularly to a locking device for non-rotatively fixing a set screw or stud engaged through the check nut to hold the nut in a given position against displacement.

The invention herein, while particularly applicable to a check nut, may more generally relate to the means for locking a rotative adjustable member against rotative displacement, so that an object of the invention is to provide a device for fixing the adjustable member in a given position, so that it may not become displaced in use, said device being of cheap and simple construction, easily and quickly applied.

The invention consists of an annular nut, having a peripheral groove, for receiving and confining a spring wire clip or ring, for engaging into a slot or notch of a set screw or stud, diametrically or radially engaged through the nut, the clip holding the set screw against rotative displacement.

Other objects and features of the invention will be more fully set forth in the description of the accompanying drawing, forming a part of this application, in which.

Figure 1:
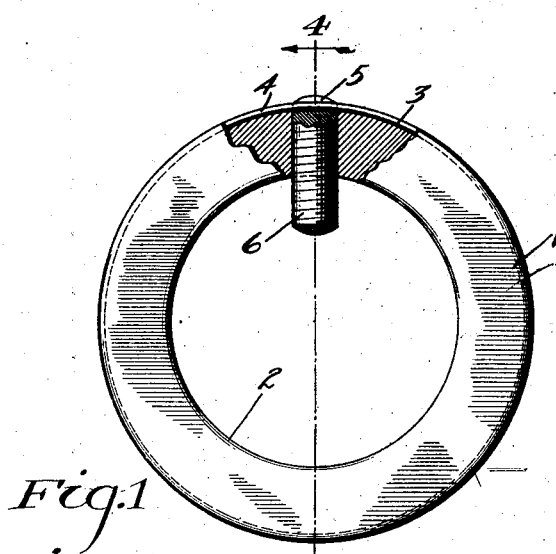
Figure 1 is a side elevation of a check nut with a portion in section to show the set screw radially engaged through the nut, and further showing the wire clip as a locking device engaged with the set screw.
Figure 2:
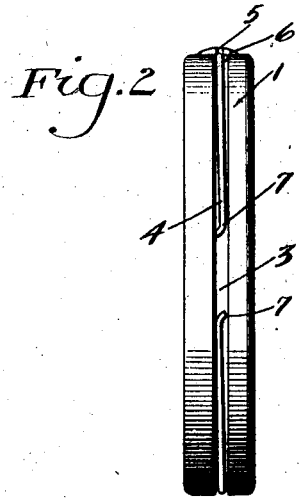
Figure 2 is an edge view.
Figure 4:
Figure 4 is a section on line 4—4, Figure 1.
Figure 3:
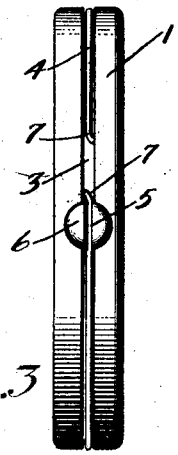
Figure 3 is a view similar to Figure 2 with the set screw viewed in plan.

1 indicates an annular or ring form of check nut with its bore 2 screw threaded, and primarily represents a collar adapted to be fixed upon shaft for securing gears and and the like in position thereupon. The ring, however, may be representative of any form of member, movable or otherwise, having a set screw or stud engaged therewith, where it is desirable to lock or fix the screw or stud against rotative displacement, and, therefore, the check nut may be designated as a body member. The check nut is provided with a peripheral groove 3 as a channel or socket for the split-ring clip 4, preferably formed of spring wire adapted to be engaged in a cross slot or notch 5 in the head end of the set screw or stud 6, engaged through the ring, when the slot 5 is in alignment and registration with the groove 3.

The ends of the clip are slightly oppositely turned or angled to provide spurs 7, 7, which respectively frictionally engage the opposite side walls of the groove 3 to resist the free motion of the clip circumferentially within the groove, said spurs also serving as heads at the ends of the clip to prevent longitudinal disengagement from the screw slot.

The clip convolution normally is helical to give it a lateral yield, twist or thrust, requiring it to be sprung for introduction within the groove, and when therewithin, causing the spurs to be compressively engaged against the side walls of the groove.

After the check nut or collar 1 has been set or adjusted to position and the set screw tightened, the spring clip, as a split-ring is easily spread to engage the same about the check nut into the groove, and through the slot or notch of the screw, locking the screw against rotation. The clip encircles the check nut within the groove, and cannot be displaced laterally or accidentally detached, being completley housed therewithin. The clip being seated in a circumferential recess forms no obstruction or hazard, and, therefore, complies with the safety laws.

Having described my invention, I claim:

1. A check nut having a peripheral groove therein, a set screw radially engaged through the nut and bisecting the groove, and a split ring clip of helical form engaged in said groove and with a cross slot in the head end of the screw for holding the screw against rotation.

2. A check nut having a peripheral groove therein, a set screw radially engaged through the nut and bisecting the groove, and a split ring clip of helical form engaged in said groove and with a cross slot in the head end of the screw for holding the screw against rotation, said split ring having its ends headed to bear against respective side walls of the groove and prevent movement of the ends of the ring through the screw slot.

In witness whereof, I hereunto subscribe my name, as attested by the two subscribing witnesses.

FRANCIS B. COCKBURN.

Witnesses:
L. A. BECK,
R. KISTNER.